(12) United States Patent
Yoo et al.

(10) Patent No.: US 10,513,961 B2
(45) Date of Patent: Dec. 24, 2019

(54) NOX OFFSET DIAGNOSTIC DURING ENGINE SOAK

(71) Applicant: Ford Global Technologies, LLC, Dearborn, MI (US)

(72) Inventors: In Kwang Yoo, Ann Arbor, MI (US); Michiel J. Van Nieuwstadt, Ann Arbor, MI (US); Bret Alan Zimmerman, Grosse Pointe, MI (US); Samuel McClure, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 15/862,482

(22) Filed: Jan. 4, 2018

(65) Prior Publication Data

US 2019/0203623 A1 Jul. 4, 2019

(51) Int. Cl.
*F01N 11/00* (2006.01)
*F01N 3/20* (2006.01)
*F02M 25/08* (2006.01)

(52) U.S. Cl.
CPC ......... *F01N 3/208* (2013.01); *F02M 25/0809* (2013.01); *F02M 25/0836* (2013.01); *F01N 2900/0416* (2013.01); *F01N 2900/1404* (2013.01)

(58) Field of Classification Search
CPC ............. F01N 11/00; F01N 2550/20; F01N 2560/026; F02D 41/146; F02D 41/1461; F02D 41/1463
See application file for complete search history.

(56) References Cited

U.S. PATENT DOCUMENTS

| | | | |
|---|---|---|---|
| 9,670,817 B2 | 6/2017 | Yoo et al. | |
| 2012/0260625 A1* | 10/2012 | Feldmann | F01N 3/2066 60/273 |
| 2014/0144126 A1 | 5/2014 | Kowalkowski et al. | |
| 2016/0363030 A1* | 12/2016 | Yoo | F01N 3/208 |
| 2017/0241321 A1 | 8/2017 | Yoo et al. | |

FOREIGN PATENT DOCUMENTS

| | | | | |
|---|---|---|---|---|
| DE | 10309422 A1 * | 9/2004 | | G01N 33/0006 |
| DE | 102004048136 A1 | 4/2006 | | |
| DE | 102012011915 A1 * | 12/2013 | | F02D 41/1461 |

* cited by examiner

*Primary Examiner* — Jonathan R Matthias
(74) *Attorney, Agent, or Firm* — Geoffrey Brumbaugh; McCoy Russell LLP

(57) ABSTRACT

Methods and systems are provided for waking up a powertrain control module of an engine-driven vehicle during engine soak to perform an offset test of an exhaust NOx sensor. In one example, a method includes determining a duration to delay waking up the powertrain control module based on exhaust temperature at vehicle-off, waking up the powertrain control module after the duration has expired, and then initiating heating of the NOx sensor. After the NOx sensor lights off, heating continues for an additional duration before offset testing of the NOx sensor is performed.

20 Claims, 6 Drawing Sheets

NOX OFFSET DIAGNOSTIC DURING ENGINE SOAK

FIELD

The present description relates generally to methods and systems for controlling emissions in vehicle exhaust systems.

BACKGROUND/SUMMARY

Selective catalytic reduction (SCR) catalysts may be utilized in the exhaust systems of engines (e.g., diesel engines or other lean-burn engines) to reduce nitrogen oxide (NOx) emissions. A reductant, such as urea, may be injected into the exhaust system upstream of the SCR catalyst, and together, the reductant and the SCR catalyst may chemically reduce NOx molecules to nitrogen and water, thereby limiting NOx emissions. However, if a component of the NOx emission control system, such as the SCR catalyst, becomes degraded, NOx emissions may increase. NOx sensors, configured to measure NOx levels in the exhaust system, may therefore be positioned in the exhaust system to detect failures of the NOx emission control system. Specifically, increases in NOx levels that may be indicative of degradation of one or more components of the NOx emission control system may be detected by the NOx sensors. Thus, the efficiency of the SCR catalyst and other components of a NOx emission control system may be monitored by one or more NOx sensors positioned in the exhaust system.

Current OBD (On-Board Diagnostics) regulations require the monitoring of exhaust NOx sensors to determine whether the NOx sensors have degraded (e.g., developed gain skew), as well as to determine whether the NOx sensors have developed an offset that may influence exhaust emissions. These two types of determinations are performed independently; typically, gain skew degradation is determined via a NOx sensor self-diagnostic (SD) test, whereas a separate test may be performed to determine whether the NOx sensor has developed an offset.

One approach for determining whether a NOx sensor has developed an offset includes performing a NOx offset diagnostic procedure during engine overrun (e.g., deceleration fuel-cut) conditions, in which engine combustion does not occur. This diagnostic procedure operates on the assumption that a properly functioning NOx sensor outputs a reading close to an ambient NOx value once the overrun conditions have continued for a long enough duration.

However, the inventors of the present application potential issues with the above solution. The SCR catalyst stores ammonia (NH3), and releases NH3 downstream when too much reductant has been injected or when temperature in the exhaust has increased to a certain extent. Once NH3 release from the SCR catalyst begins, it tends to release for a longer duration than the usual overrun duration. This is problematic as the NOx sensors currently on the market tend to confuse NH3 and NOx, and read NH3 as NOx. Thus, the output of a NOx sensor located downstream of an SCR catalyst may have an erroneously high NOx offset during release of NH3 from the SCR catalyst. The erroneously high NOx offset may cause the vehicle's Malfunction Indicator Light (MIL) to illuminate unnecessarily, resulting in warranty issues. In the future, as NOx emissions regulation becomes more stringent, NH3 release from SCR catalysts may occur even more frequently due to increased urea injection, thus undesirably increasing the likelihood of such warranty issues.

In one example, the issues described above may be addressed by a method which includes, during a soak period following vehicle-off of an engine-driven vehicle, waking up a powertrain control module and heating an exhaust NOx sensor. At light-off of the NOx sensor, the powertrain control module detects NOx sensor output, determines a duration to continue heating the NOx sensor based on the detected output, and continues to heat the NOx sensor until the duration ends. At the end of the duration, a NOx sensor offset test is performed. The inventors herein have recognized that by waiting for a duration (e.g., approximately 4 hours) after vehicle-off before waking up the powertrain control module, and then heating up the NOx sensor for an additional duration after it lights off before performing NOx sensor offset testing, encapsulated NOx, NH3, and moisture within the sensor protection tube may be dissipated, thereby avoiding an erroneously high NOx offset reading.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for waking up the powertrain control module (PCM) during an engine soak to performing a NOx sensor offset test. The exhaust systems of diesel engines, such as the engine system shown in FIG. 1A, and exhaust system shown in FIG. 1B, may comprise a selective catalytic reduction (SCR) catalyst for reducing NOx emissions. The efficiency of the SCR catalyst may be monitored by one or more NOx sensors positioned upstream and/or downstream of the SCR catalyst. OBD regulations require monitoring of NOx sensor operation to ensure proper operation, including monitoring for gain skew and offset. Gain skew may be monitored via SD tests performed at the NOx sensor, with the PCM determining pass/fail with thresholding and compensations. In contrast, NOx sensor offset is performed via the PCM reading NOx sensor output values directly from the NOx sensor and determining the offset without the NOx sensor performing its own test.

Figure 2:
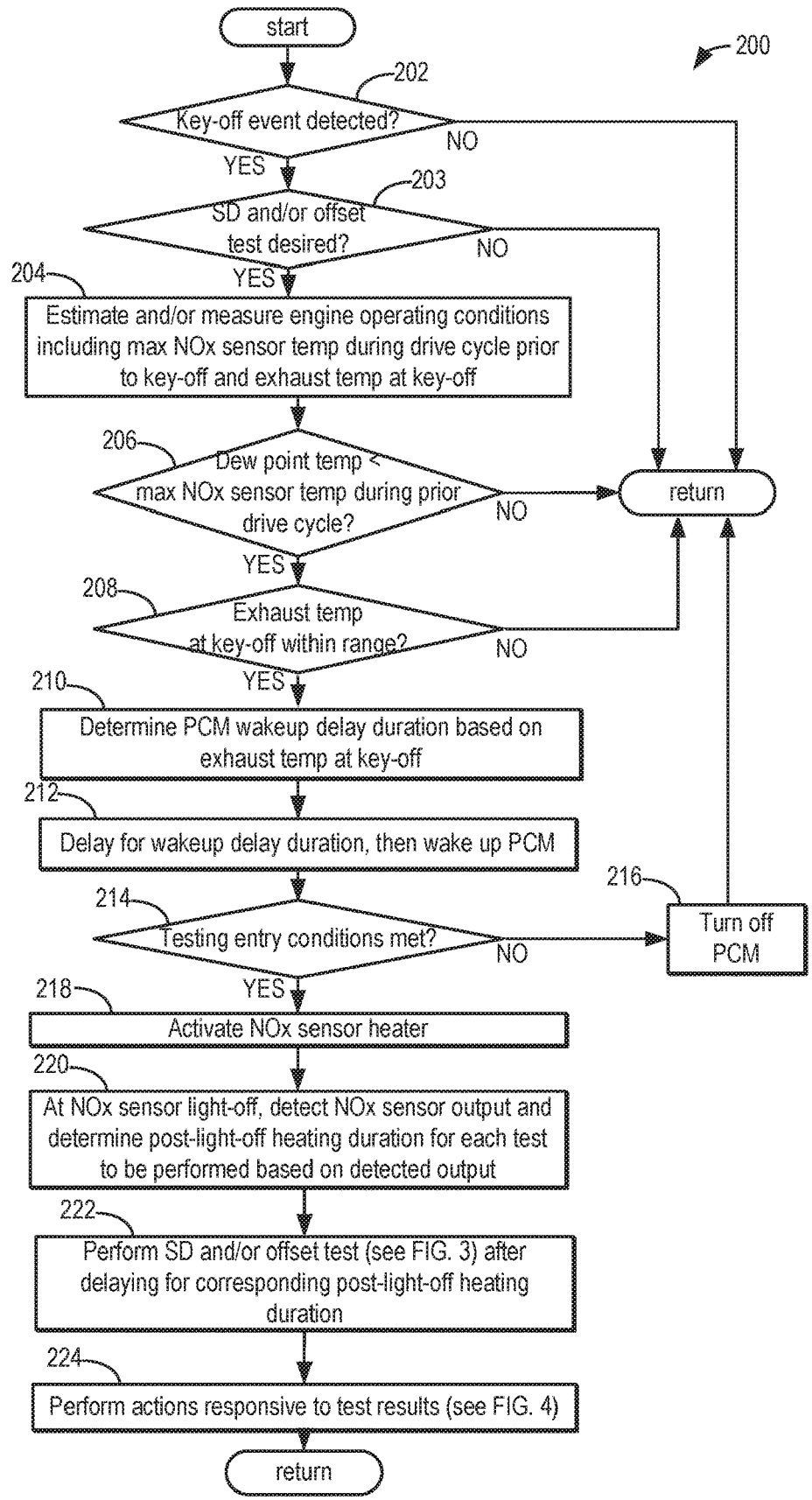
FIG. 2 shows a high-level flow chart of an example method for performing SD and/or offset tests during engine soak.

In FIG. 2, an example method for performing SD and/or offset tests of a NOx sensor during engine soak is depicted.

The testing involves waking up the PCM via an alarm clock after delaying for a duration (e.g., 4 hours) after vehicle-off, beginning to heat the NOx sensor via a NOx sensor heater, and then continuing to heat the NOx sensor after it reaches light-off temperature for a calibratable duration before performing offset testing. The vehicle-off is where the vehicle is shut off, which in a vehicle using a physical key would be referred to as a key-off. However, the vehicle may be operated via a FOB and have a push-button arrangement, or still other vehicle on/off controls such as remote on/off operation or others. Thus, herein wherever reference is made to a key-off event occurring, an expressly included alternative option would be another vehicle-off conditions such as noted above, even if not listed out separately in the description. Likewise, a vehicle-on event may include a key-on event when the vehicle is operated with a physical key. In an alternative, a vehicle-on event may include the situation where a FOB is used with a push-button arrangement as noted above. Further, still other options are possible such as remote vehicle turn-on systems.

Figure 3:
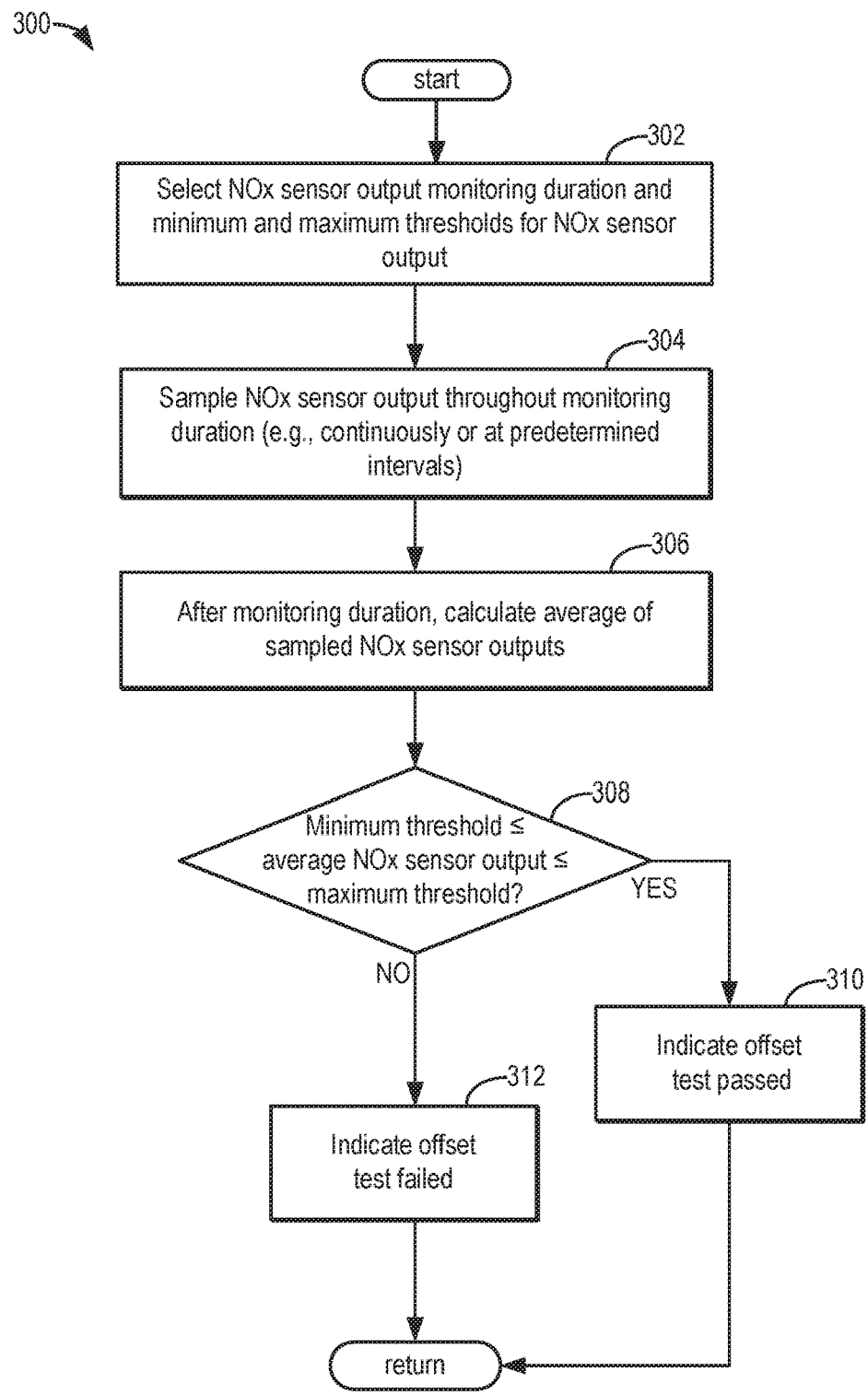
FIG. 3 shows a high-level flow chart of an example method for performing an offset test.

If SD testing is to be performed, it is performed either at light-off, or after light-off but prior to the offset testing. The additional NOx sensor heating prior to performing the offset testing advantageously dissipates NOx and/or ammonia encapsulated within the sensor protection tube, so as to read a NOx offset value closer to a "true" offset value. FIG. 3 depicts an exemplary offset testing routine.

Figure 4:
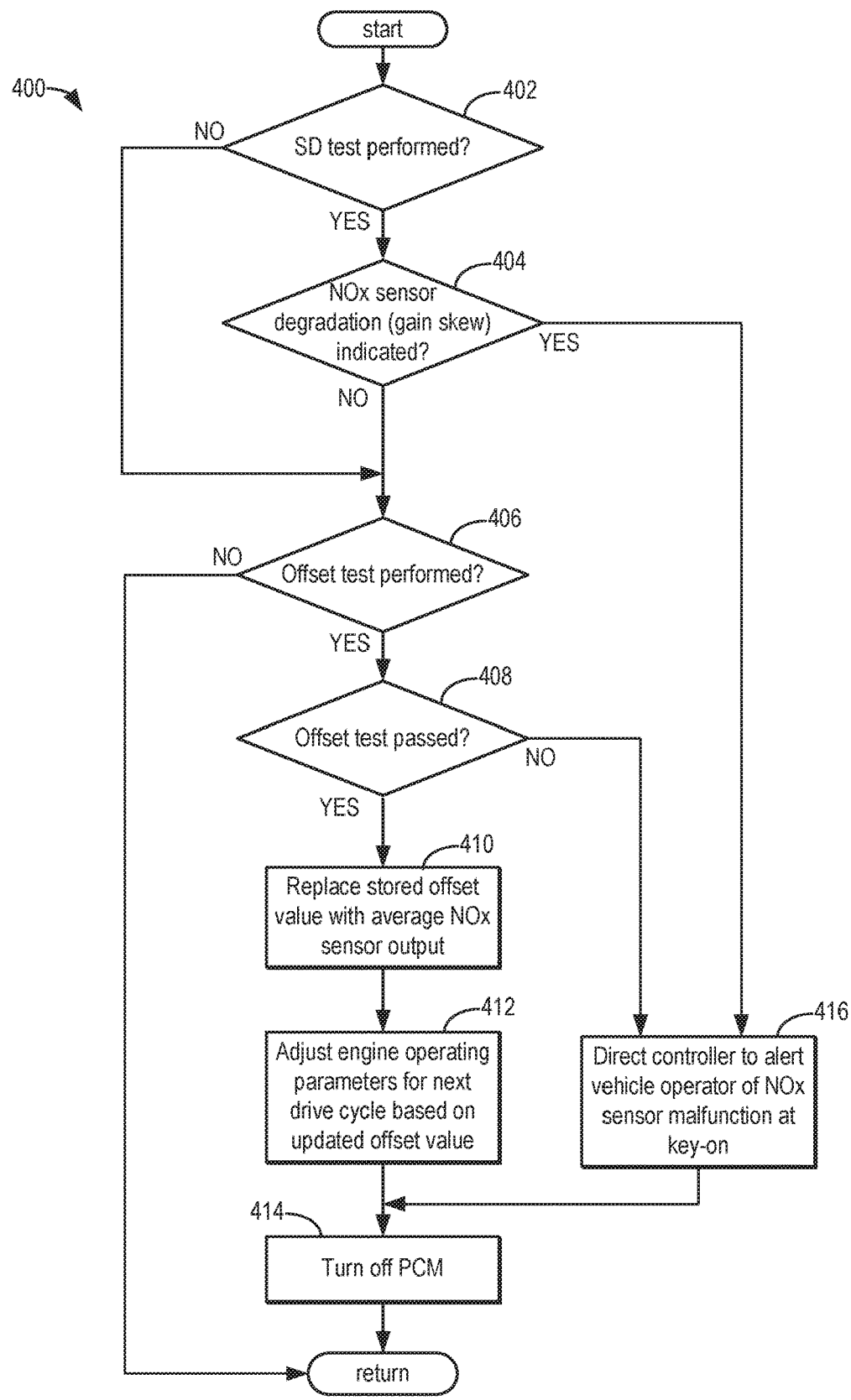
FIG. 4 shows a high-level flow chart of an example method for performing actions in response to the results of SD and/or offset tests performed during engine soak.

As shown in FIG. 4, actions may be performed in response to the results of the SD and/or offset testing, such as adjustment of vehicle operation, updating of a stored offset value, alerting a vehicle operator, etc.

Figure 1A:
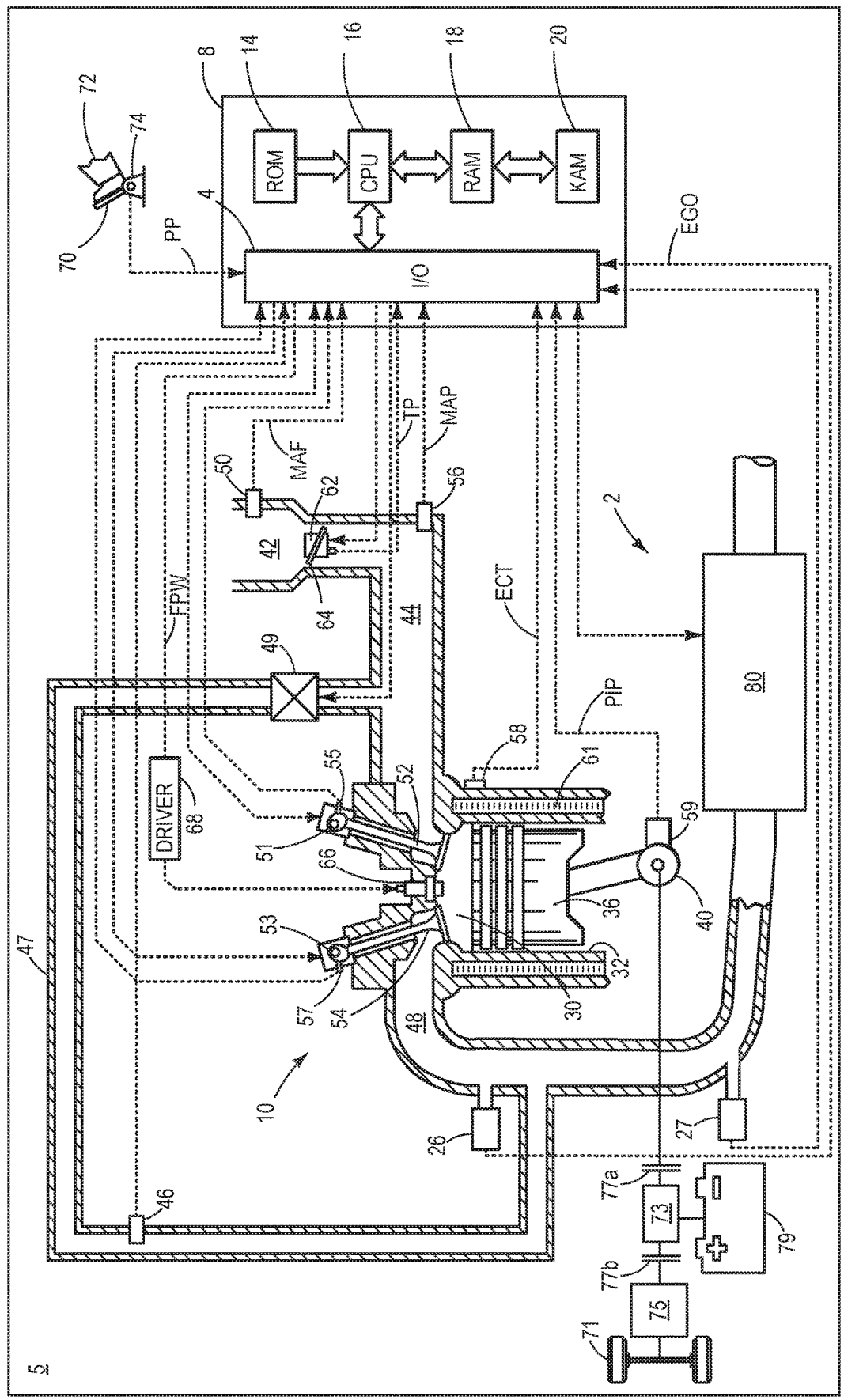
FIG. 1A shows a schematic diagram of an engine including an exhaust system with an exhaust gas treatment system.

Referring now to FIG. 1A, a schematic diagram showing one cylinder of a multi-cylinder engine 10, which may be included in a propulsion system of a vehicle (e.g., automobile) 5, is illustrated. Vehicle 5, including engine 10, may be controlled at least partially by a control system including a controller 8 and by input from a vehicle operator 72 via an input device 70. Controller 8 may be configured as a PCM. In this example, the input device 70 includes an accelerator pedal and a pedal position sensor 74 for generating a proportional pedal position signal PP. A combustion chamber (e.g., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 receives intake air from an intake manifold 44 via an intake passage 42 and exhausts combustion gases via an exhaust passage 48. The intake manifold 44 and the exhaust passage 48 can selectively communicate with the combustion chamber 30 via intake valve 52 and exhaust valve 54. In some embodiments, the combustion chamber 30 may include two or more intake valves and/or two or more exhaust valves.

In the example depicted in FIG. 1A, the intake valve 52 and exhaust valve 54 are controlled by cam actuation via respective cam actuation systems 51 and 53. The cam actuation systems 51 and 53 each include one or more cams and may utilize one or more of cam profile switching (CPS), variable cam timing (VCT), variable valve timing (VVT), and/or variable valve lift (VVL) systems that may be operated by the controller 8 to vary valve operation. The positions of the intake valve 52 and the exhaust valve 54 are determined by position sensors 55 and 57, respectively. In alternative embodiments, the intake valve 52 and/or the exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 8 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

In the depicted example, the intake passage 42 includes a throttle 62 having a throttle plate 64. In this particular example, the position of the throttle plate 64 is varied by the controller 8 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 is provided to the controller 8 by throttle position signal TP. In the depicted example, the intake passage 42 further includes a mass air flow (MAF) sensor 50 and a manifold air pressure (MAP) sensor 56 for providing signals MAF and MAP, respectively, to the controller 8.

Further, in the depicted example, an exhaust gas recirculation (EGR) system is configured to route a desired portion of exhaust gas from the exhaust passage 48 to the intake passage 42 via an EGR passage 47. The amount of EGR provided to the intake manifold 44 may be varied by a controller 8 via an EGR valve 49. By introducing exhaust gas to the engine 10, the amount of available oxygen for combustion is decreased, thereby reducing combustion flame temperatures and reducing the formation of NOx for example. As depicted, the EGR system further includes an EGR sensor 46 arranged within the EGR passage 47, which provides an indication of one or more of pressure, temperature, and concentration of the exhaust gas within the EGR passage.

Figure 1B:
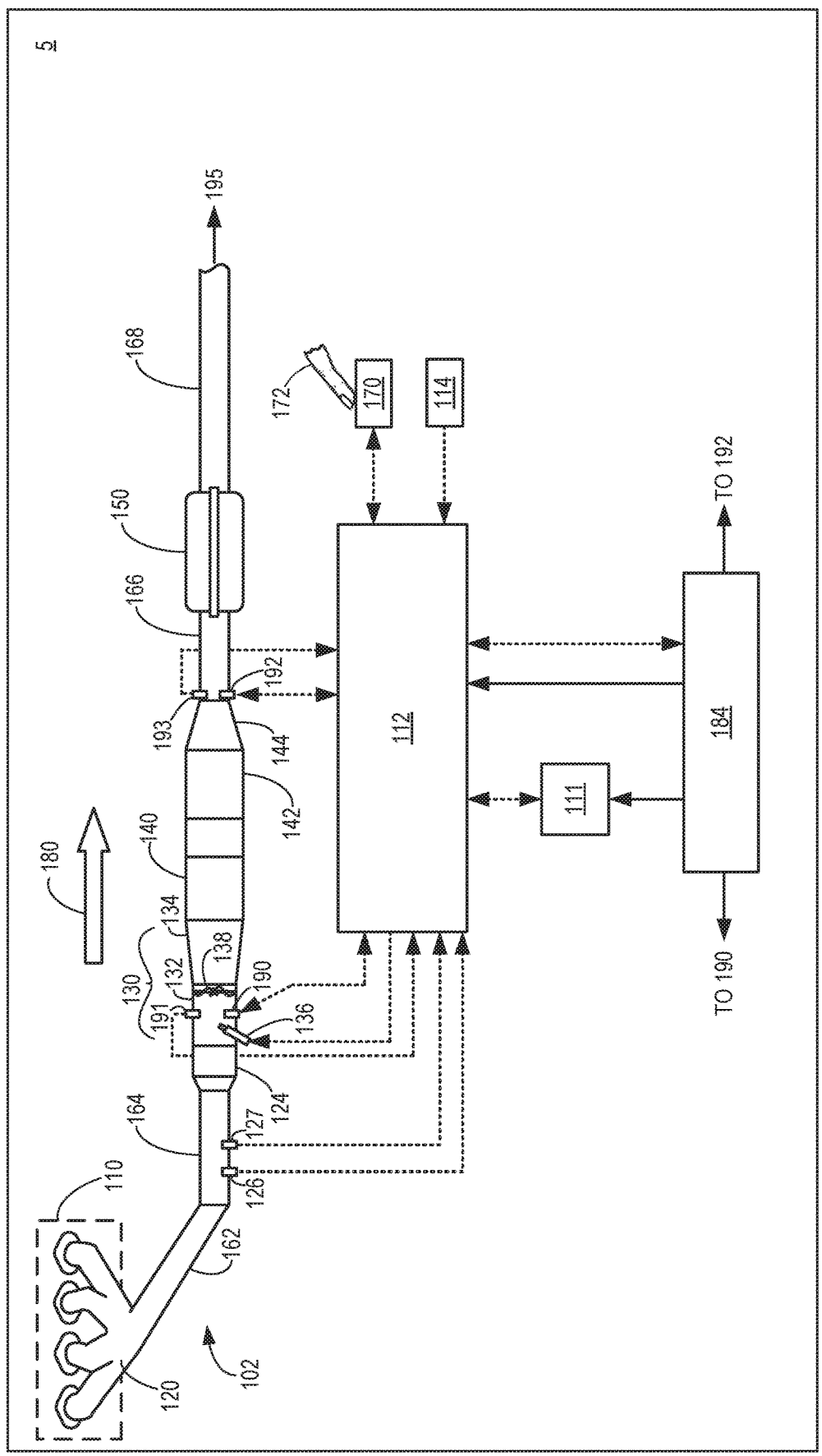
FIG. 1B shows a schematic diagram of an exhaust system for receiving engine exhaust gas.

In the depicted example, engine 10 includes an exhaust system 2. Exhaust system 2 includes an exhaust gas sensor 26 coupled to the exhaust passage 48 upstream of an exhaust gas treatment system 80, and an exhaust gas temperature sensor 27 coupled to the exhaust gas passage 48 upstream of exhaust gas treatment system 80. An exemplary embodiment of exhaust gas treatment system 80 is shown in FIG. 1B and described below. The sensor 26 may be any suitable sensor for providing an indication of exhaust gas air/fuel ratio, such as a linear oxygen sensor or UEGO (universal or wide-range exhaust gas oxygen) sensor, a two-state oxygen sensor or EGO sensor, a HEGO (heated EGO) sensor, a NOx sensor, a hydrocarbon (HC) sensor, or a carbon monoxide (CO) sensor. Sensor 26 provides a signal EGO to the controller 8 in the example shown in FIG. 1A.

The controller 8 is shown in FIG. 1A as a microcomputer, including a microprocessor (e.g., CPU) 16, input/output ports 4, an electronic storage medium for executable programs and calibration values shown as a read-only memory (ROM) chip 14 in this particular example, random access memory (RAM) 18, keep alive memory (KAM) 20, and a data bus. The controller 8 communicates with, and therefore receives various signals from, sensors coupled to the engine 10, in addition to those signals previously discussed, including signals representing values of MAF from MAF sensor 50; engine coolant temperature (ECT) from a temperature sensor 58 coupled to a cooling sleeve 61; a profile ignition pickup signal (PIP) from a Hall effect sensor 59 (or other type of sensor) coupled to the crankshaft 40; throttle position (TP) from a throttle position sensor; MAP from MAP sensor 56; exhaust constituent concentration (EGO) from the exhaust gas sensor 26; and exhaust gas temperature from exhaust gas temperature sensor 27. An engine speed signal, RPM, may be generated by the controller 8 from signal PIP. Further sensors in communication with controller 8 are described below with reference to FIG. 1B. Based on signals received from the sensors, and further based on instructions stored in memory, controller 8 employs the various actuators of FIG. 1A to adjust engine operation. The storage medium read-only memory 14 can be programmed with non-transitory, computer-readable data representing instructions executable by the processor 16 for performing the methods described below as well as other variants that are anticipated but not specifically listed. Example methods are described herein with reference to FIGS. 2-4.

As noted above, FIG. 1A shows only one cylinder of a multi-cylinder engine. Each cylinder may similarly include its own set of intake/exhaust valves, fuel injector, spark plug, etc.

In the depicted example, vehicle 5 is a hybrid vehicle with multiple sources of torque available to one or more vehicle wheels 71. In other examples, however, vehicle 5 is a conventional vehicle with only an engine, or an electric vehicle with only one or more electric machines. In the example shown, vehicle 5 includes engine 10 and an electric machine 73. Electric machine 73 may be a motor or a motor/generator. Crankshaft 40 and electric machine 73 are connected via a transmission 75 to vehicle wheels 71 when one or more clutches are engaged. In the example shown, a first clutch 77a is provided between crankshaft 40 and electric machine 73, and a second clutch 77b is provided between electric machine 73 and transmission 75. Controller 8 may be configured to send a signal to an actuator of each clutch to engage or disengage the clutch, so as to connect or disconnect crankshaft 40 from electric machine 73 and the components connected thereto, and/or connect or disconnect electric machine 73 from transmission 75 and the components connected thereto. Transmission 75 may be a gearbox, a planetary gear system, or another type of transmission. The powertrain may be configured in various manners such that the vehicle is a parallel, series, or series-parallel hybrid vehicle.

Electric machine 73 receives electrical power from a traction battery 79 to provide torque to vehicle wheels 71. Optionally, electric machine 73 may also be operated as a generator to provide electrical power to charge battery 79, for example during a braking operation.

FIG. 1B illustrates a schematic view of an example exhaust system 102 for transporting exhaust gases produced by an internal combustion engine 110 of vehicle 5. Exhaust system 102 may correspond to exhaust system 2 of FIG. 1A, and engine 110 may correspond to engine 10 of FIG. 1A. In one non-limiting example, engine 110 is a diesel engine that produces a mechanical output by combusting a mixture of air and diesel fuel. Alternatively, engine 110 may be another type of engine such as a gasoline burning engine.

In the non-limiting example shown in FIG. 1B, exhaust system 102 includes an exhaust manifold 120 for receiving exhaust gases produced by one or more cylinders of engine 110, an oxidation catalyst 124, a mixing region 130, a selective catalytic reductant (SCR) catalyst 140, an emission control device 142, and a noise suppression device 150. Additionally, exhaust system 102 includes a plurality of exhaust pipes or passages for fluidically coupling the various exhaust system components of exhaust system 102. However, one or more of the oxidation catalyst 124, mixing region 130, SCR catalyst 140, emission control device 142, and noise suppression device 150 may be arranged in any order or combination in the exhaust system 102.

Exhaust system 102 may be arranged on the underside of the vehicle chassis. Additionally, exhaust system 102 may include one or more bends or curves to accommodate a particular vehicle arrangement. Further still, in some embodiments, exhaust system 102 may include additional components not illustrated in FIG. 1B and/or may omit components described herein.

The flow of gases and/or fluids in the exhaust system 102 occurs in a direction away from exhaust manifold 120, towards surrounding environment 195, through the exhaust system 102, and out of the exhaust system 102 through an exhaust passage 168 (alternatively referred to as fourth exhaust passage 168 below). Thus, in the example shown in FIG. 1B, the flow of gases and/or fluids in the exhaust system 102 may generally be from left to right as indicated by flow direction arrow 180. Therefore, in the description herein, the term "downstream" refers to the relative positioning of components in the exhaust system 102 with respect to the flow direction in exhaust system 102. As such, if a first component is described as downstream of a second component in the exhaust system 102, then gases and/or fluids flowing in the exhaust system 102 flow through the second component before flowing through first component.

Exhaust manifold 120 is fluidically coupled to oxidation catalyst 124 via a first exhaust passage 162 and a second exhaust passage 164. Oxidation catalyst 124 is arranged downstream of exhaust manifold 120 in this example, with no components separating the oxidation catalyst 124 from the exhaust manifold 120 other than exhaust passages 162 and 164. First exhaust passage 162 and second exhaust passage 164 provide fluidic communication between exhaust manifold 120 and oxidation catalyst 124. In some examples, oxidation catalyst 124 is a diesel oxidation catalyst (DOC), e.g., an exhaust flow-through device which includes a substrate having a honeycomb structure and a large surface area coated with a catalyst layer. The catalyst layer may include precious metals including, but not limited to, platinum and palladium. As the exhaust gas flows over the catalyst layer, CO, gaseous HCs, and liquid HC particles may be oxidized to reduce emissions.

Mixing region 130 is arranged immediately downstream of oxidation catalyst 124 for receiving a liquid reductant, with no additional components separating mixing region 130 from oxidation catalyst 124. Mixing region 130 includes a first mixing region 132 and a second mixing region 134, the second mixing region 134 arranged downstream of the first mixing region 132. The first mixing region 132 includes an injector 136, for injecting a liquid into the mixing region 130. In some examples, the liquid injected by injector 136 is a liquid reductant such as ammonia or urea. The liquid reductant may be supplied to injector 136 from a storage tank in some examples. In this example, injector 136 is electronically actuated and in electrical and/or electronic communication with a controller 112, which may correspond to controller 8 of FIG. 1A. Similar to controller 8 of FIG. 1A, controller 112 may be configured as a PCM. Controller 112 receives signals from the various sensors of FIG. 1B and employs the various actuators of FIG. 1B to adjust engine operation based on the received signals and instructions stored in memory of the controller. For example, controller 112 is configured to send signals to an actuator of injector 136 for adjusting operation of the injector. In response to signals received from controller 112, the actuator of injector 136 may adjust the amount of liquid reductant being injected into the mixing region 130 and/or the timing of the injection.

A feedgas NOx sensor (alternatively referred to herein as a first NOx sensor) 190 and a feedgas temperature sensor (alternatively referred to herein as a first temperature sensor) 191 are arranged in the first mixing region 132. Accordingly, the first NOx sensor and first temperature sensor are arranged downstream of oxidation catalyst 124 in this example, with no other exhaust treatment devices interposed between the oxidation catalyst and sensors 190 and 191. The positioning of first NOx sensor 190 and first temperature sensor 191 in exhaust system 102 may be such that first NOx sensor 190 and first temperature sensor 191 are superposed. For example, feedgas NOx sensor 190 and feedgas temperature sensor 191 may be approximately aligned with one another and may coincide with one another in exhaust system 102. Said another way, first NOx sensor 190 and first temperature sensor 191 may be longitudinally aligned in first mixing region 132. In some examples, first NOx sensor 190 and first temperature sensor 191 are arranged perpendicular to the flow of gases and/or fluids in the exhaust system 102, and in such examples, may be positioned such that they are parallel to one another. In other examples, first temperature sensor 191 is positioned directly adjacent to first NOx sensor 190, such that first temperature sensor 191 and first NOx sensor 190 are in face-sharing contact with one another and in thermal communication. In this way, gases and/or fluids flowing through the exhaust system 102, and more specifically through first mixing region 132, may flow past first NOx sensor 190 and first temperature sensor 191 at approximately the same time. As such, first temperature sensor 191 may be positioned within first mixing region 132 for measuring a temperature of gases and/or fluids flowing past and/or being sampled at first NOx sensor 190. However, in other examples, first temperature sensor 191 may not be aligned with first NOx sensor 190, and instead spaced away from the NOx sensor 190 in the longitudinal direction.

First temperature sensor 191 is electronically coupled to controller 112, and outputs of first temperature sensor 191 corresponding to a temperature of gases and/or fluids flowing past first NOx sensor 190 are sent to controller 112. Similarly, first NOx sensor 190 is electronically coupled to controller 112, and outputs of first NOx sensor 190 corresponding to the level of NOx (e.g., concentration of NOx and/or $O_2$) in gases and/or fluids flowing past first NOx sensor 190 are sent to controller 112.

While first NOx sensor 190 and first temperature sensor 191 are positioned downstream of injector 136 in FIG. 1B, they may alternatively be positioned substantially in line with injector 136. In still further examples, first NOx sensor 190 and first temperature sensor 191 may be positioned upstream of injector 136, or upstream of oxidation catalyst 124.

Second mixing region 134 is configured to accommodate a change in cross-sectional area or flow area between first mixing region 132 and SCR catalyst 140, which is arranged immediately downstream of second mixing region 134 in the depicted example. Specifically, the cross-sectional flow area created by the second mixing region 134 may increase in a downstream direction as shown. Therefore, first NOx sensor 190 and first temperature sensor 191 are positioned upstream of the SCR catalyst 140. In some examples, no additional components separate second mixing region 134 from SCR catalyst 140.

A mixing device 138 is arranged downstream of injector 136. Mixing device 138 is configured to receive engine exhaust gas and/or injected fluid reductant from injector 136 and direct the engine exhaust gas and/or fluid reductant downstream of mixing device 138 towards SCR catalyst 140. As shown in FIG. 1B, mixing device 138 may comprise a circular disc of fin sections. Each fin section may have a straight edge and a curved edge. In some examples, mixing device 138 is positioned in the first mixing region 132 downstream of injector 136, first temperature sensor 191, and first NOx sensor 190. In other examples, mixing device 138 is positioned in the second mixing region 134. Mixing device 138 is configured to increase the commingling and therefore uniformity of the exhaust gas and fluid reductant mixture in second mixing region 134 before the mixture reaches SCR catalyst 140.

SCR catalyst 140 is configured to convert NOx into water and nitrogen as inert byproducts of combustion using the fluid reductant, e.g., ammonia (NH3) or urea injected by the injector 136, and an active catalyst. The SCR catalyst, which may alternatively be referred to as a DeNOx catalyst, may be constructed of titanium dioxide containing the oxides of transition metals such as, for example, vanadium, molybdenum, and tungsten to act as catalytically active components. SCR catalyst 140 may be configured as a ceramic brick or a ceramic honeycomb structure, a plate structure, or any other suitable design. SCR catalyst 140 can include any suitable catalyst for reducing NOx or other products of combustion resulting from the combustion of fuel by engine 110.

Emission control device 142 is positioned downstream of SCR catalyst 140. In some examples, emission control device 142 is a diesel particulate filter (DPF). The DPF may operate actively or passively, and the filtering medium can be of various types of material and geometric construction. One example construction includes a wall-flow ceramic monolith comprising alternating channels that are plugged at opposite ends, thus forcing the exhaust flow through the common wall of the adjacent channels whereupon the particulate matter is deposited.

Alternatively, emission control device 142 and SCR catalyst 140 may be combined on one substrate (e.g., a wall-flow ceramic DPF element coated with NOx storage agents and platinum group metals).

After passing through emission control device 142, exhaust gases and/or fluids flow through an after-treatment region 144. After-treatment region 144 is configured to accommodate a change in cross-sectional area or flow area between emission control device 142 and a third exhaust passage 166 arranged immediately downstream of emission control device 142. Specifically, the cross-sectional flow area created by the after-treatment region 144 decreases in a downstream direction. After-treatment region 144 fluidically couples emission control device 142 to third exhaust passage 166. However, in other examples, exhaust system 102 does not include an after-treatment region, and emission control device 142 is directly and/or physically coupled to third exhaust passage 166, with no additional components separating emission control device 142 from third exhaust passage 166.

A tailpipe temperature sensor (alternatively referred to herein as a second temperature sensor) 193 and a tailpipe NOx sensor (alternatively referred to herein as a second NOx sensor) 192 are positioned in third exhaust passage 166. However, in other examples, second temperature sensor 193 and second NOx sensor 192 may be positioned in after-treatment region 144. In all examples, however, second temperature sensor 193 and second NOx sensor 192 are positioned downstream of SCR catalyst 140 and emission control device 142. The positioning of second temperature sensor 193 and second NOx sensor 192 relative to one another and relative to after-treatment region 144 may be similar to the positioning of first temperature sensor 191 and first NOx sensor 190 relative to one another and relative to first mixing region 132 which is described above.

Second temperature sensor 193 is electronically coupled to controller 112, and outputs of second temperature sensor 193 corresponding to a temperature of gases and/or fluids flowing past second NOx sensor 192 are sent to controller 112. Similarly, second NOx sensor 192 is electronically coupled to controller 112, and outputs of second NOx sensor 192 corresponding to the level of NOx in gases and/or fluids flowing past second NOx sensor 192 are sent to controller 112.

First NOx sensor 190 and second NOx sensor 192 may be constructed similarly and function similarly. In one non-limiting example, each of the NOx sensors comprises a sensing element arranged within a protection tube, a heater arranged within the protection tube, the heater in thermal communication with the sensing element and optionally in direct physical contact with the sensing element, and gas exchange holes configured to intake gas to be tested and exhaust gas after it is tested. The sensing element may include a plurality of layers of one or more ceramic materials arranged in a stacked configuration. The layers may include one or more layers of a solid electrolyte capable of conducting ionic oxygen. Examples of suitable solid electrolytes include, but are not limited to, zirconium oxide-based materials. In each NOx sensor, a heater is disposed between the various layers (or otherwise in thermal communication with the layers) to increase the ionic conductivity of the layers. The heater is configured to receive power from a battery (e.g., battery 184 of FIG. 1B) or another power source, including during key-off conditions, in order to heat the NOx sensor to light-up temperature and optionally beyond light-off temperature, as discussed below. For example, as described further below, an alarm clock may "wake up" the controller after a delay after a key-off event, and the controller may then send a signal to battery 184 to supply power to the heater of one or both of the NOx sensors to heat up the sensor(s).

Both NOx sensors may be configured to measure and/or estimate a concentration of NOx and/or $O_2$ in an exhaust gas mixture flowing through exhaust system 102, and transmit this information to the controller. During engine operation, the first NOx sensor measures NOx levels emitted by the engine 110, while the second NOx sensor measures NOx levels remaining in the exhaust system 102 after treatment by the SCR catalyst 140. By comparing the outputs of the two NOx sensors 190 and 192, the overall NOx removal efficiency of the exhaust system 102 may be estimated.

However, NOx sensors 190 and 192 may become degraded (e.g., gain-skewed, cracked, contaminated, etc.), and as a result the accuracy of their outputs used to estimate and/or measure NOx levels in the exhaust system 102 may become reduced. Further, the NOx sensors may develop an offset that influences exhaust emissions. In order to detect and diagnose NOx sensor degradation, an SD test may be performed after a vehicle key-off event, as described in greater detail below with reference to FIG. 2. In contrast, in order to detect and diagnose NOx sensor offset, an offset test may be performed, after the SD test, while key-off conditions are still present.

Further, an ambient temperature sensor 114 is electronically coupled to controller 112, and outputs of ambient temperature sensor 114 corresponding to an ambient temperature (e.g., a temperature of the atmosphere outside of the vehicle) are sent to controller 112. Ambient temperature sensor 114 may be arranged at a location in the vehicle which is in thermal communication with the atmosphere outside of the vehicle (e.g., at an inlet of an engine intake pipe).

The depicted exhaust system further includes an exhaust gas sensor 126 and an exhaust gas temperature sensor 127, which may correspond to exhaust gas sensor 26 and exhaust gas temperature sensor 27 of FIG. 1A. While sensors 126 and 127 are shown arranged in second exhaust passage 164 for the sake of example, they may alternatively be arranged at any portion of the exhaust system upstream of exhaust treatment system 80 (e.g., in first exhaust passage 162). Sensors 126 and 127 are each electronically coupled to controller 112, and their outputs are sent to controller 112.

Noise suppression device 150 is arranged downstream of catalyst 140 and emission control device 142. Noise suppression device 150 is configured to attenuate the intensity of sound waves traveling away from exhaust manifold 120, towards surrounding environment 195. Third exhaust passage 166 provides fluidic communication between after-treatment region 144 and noise suppression device 150. Thus, exhaust gases flow from the after-treatment region 144, through third exhaust passage 166, to noise suppression device 150. After passing through noise suppression device 150, exhaust gases flow through fourth exhaust passage 168, en route to the surrounding environment 195.

A key-off event may be detected by the controller 112 based on signals received from an input device 170 of vehicle 5, which is depicted schematically in FIG. 1B. The input device 170 may include a button, switch, knob, ignition, touch screen display, etc., where the position and/or digital state of the input device 170 is adjustable to turn the engine 110 on or off. In the context of a hybrid vehicle, input device 170 may further be adjustable to turn an electric motor which provides vehicle drive power on or off. Input device 170 may therefore, in some examples, be a vehicle ignition with a keyed engine-on, engine-off functionality. Alternatively, in the context of a keyless vehicle, the start/stop and/or on/off functionality of the vehicle may be controlled by a button, switch, knob, touch screen, etc. Thus, vehicle operator 172 may adjust the input device 170 to a first position and/or digital state to initiate a key-on event to turn on the engine 110 and/or an electric motor providing drive force, whereas the vehicle operator 172 may adjust the position of the input device to a second position and/or digital state to initiate a key-off event to turn off the engine 110 and/or stop an electric motor from providing vehicle drive force. Said another way, a key-off event may refer to conditions where the engine 110 is shutdown to rest and the vehicle is off (e.g., during a vehicle key-off event, or an engine stop event in a keyless system with a stop/start button), and where the electric motor is disabled from providing drive force to the vehicle in the context of a hybrid vehicle. Thus, the key-off event may include terminating a combustion cycle in the engine 110 based on input from the vehicle operator 172 via input device 170. Input device 170 is electronically coupled with controller 112, and configured to send a signal indicating the position and/or digital state of input device 170 to controller 112 (e.g., on an interrupt basis when the position/state changes, continually, or periodically).

In accordance with the methods disclosed herein, power is provided to the NOx sensors after a duration has elapsed following a key-off event, to allow for performance of SD tests followed by offset tests. In the depicted example, power is provided to NOx sensors 190 and 192 by a battery 184 during key-off, including to the heater of each NOx sensor to effect heating of the NOx sensor. In examples where the vehicle is a hybrid vehicle, battery 184 may optionally correspond to battery 79 of FIG. 1A. Battery 184 electronically communicates with controller 112 for receiving digital signals therefrom. Further, during a key-off event, power may be provided to controller 112 via battery 184.

As described in greater detail below with reference to FIGS. 2-3, controller 112 may comprise computer-readable instructions stored in non-transitory memory for initiating NOx sensor SD tests and/or offset tests after a key-off event, and in particular after a specified duration has elapsed following a key-off event. The specified duration may be determined by the controller based on engine operating conditions, as detailed below. In any case, the specified duration is long enough that NOx sensor SD tests and/or offset tests are not initiated while the engine is still in after-run (e.g., while the engine is turned off after a key-off event but power is still supplied to the one or more vehicle components via a glow plug or battery). Instead, the tests are initiated after (e.g., several hours after) completion of after-run. In order to wake up the controller after the specified duration has elapsed, the vehicle includes an electronic timer or alarm clock 111 configured to "wake up" controller 112. Alarm clock 111 therefore is in electronic communication with controller 112, and specifically with a microprocessor unit of controller 112. In the example shown in FIG. 1B, alarm clock 111 is powered by battery 184. However, alarm clock 111 may include its own power source such as a battery, or may be powered by a battery of the controller 112, without departing from the scope of this disclosure.

FIGS. 1A-1B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 2-4 each depict a high-level flowchart for an example method. The methods of FIGS. 2-4 will be described in reference to the systems shown in FIGS. 1A-1B, though it should be understood that these methods may be applied to other systems without departing from the scope of this disclosure. The methods of FIGS. 2-4 may be carried out by a controller, such as controller 112, and may be stored as executable instructions in non-transitory memory. Instructions for carrying out the methods included herein may be executed by the controller based on instructions stored on a memory of the controller and in conjunction with signals received from sensors of the vehicle system, such as the sensors described above with reference to FIGS. 1A-1B. The controller may employ actuators such as the heaters of the NOx sensors, the reductant injector, etc. according to the methods, as described further below.

The methods of FIGS. 2-4 refer generally to a NOx sensor. This NOx sensor may be any NOx sensor arranged in exhaust system 102, e.g., NOx sensor 190 or NOx sensor 192. In some examples, the methods may be performed simultaneously for multiple NOx sensors (e.g., both of sensors 190 and 192). Alternatively, the methods may be performed in succession for multiple NOx sensors, to avoid excessive battery draw at any given time.

Turning first to FIG. 2, it depicts a high-level flowchart for an example method 200 for performing SD and/or offset tests, and performing actions responsive to the test results.

At 202, the method includes detecting a key-off event. As discussed above, a key-off event may be detected by the controller based on signals received from an input device of such as input device 170.

If a key-off event is not detected, the method returns. Otherwise, upon detection of a key-off event, the method continues to 203 to determine whether SD and/or offset testing is desired. For example, it may be desired to perform SD and/or offset tests at regular intervals, for example, after a threshold number of drive cycles, a threshold amount of time, a threshold number of engine cycles, etc. In yet further examples, SD and/or offset tests may be desired if certain engine or environmental conditions are satisfied. For example, the interval between SD tests and/or the interval between offset tests may be adjusted based on engine operating conditions and/or environmental conditions. If neither SD nor offset tests are desired, the method returns. Otherwise, the method proceeds to 204.

At 204, the method includes estimating and/or measuring engine operating conditions. The engine operating conditions may include a maximum NOx sensor temperature during a drive cycle prior to key-off (e.g., as measured by temperature sensor 191 and/or temperature sensor 193), an exhaust temperature at key-off (e.g., as measured by temperature sensor 127), etc. For example, the controller may monitor NOx sensor throughout a drive cycle and update a stored maximum NOx sensor temperature each time the stored maximum NOx sensor temperature is exceeded, such that the maximum NOx sensor temperature during the drive cycle prior to key-off is stored in memory at the time of key-off. Similarly, the controller may monitor exhaust temperature throughout the drive cycle, and the exhaust temperature at the time of key-off may be stored in memory, such that the controller may be powered down at the time of key-off. Alternatively, after key-off, the controller may continue to receive power (e.g., from a vehicle battery) for a duration during which the maximum NOx sensor temperature during the drive cycle and the exhaust temperature at key-off are determined based on other stored data.

After 204, the method proceeds to 206 to determine whether the dew point temperature is less than the maximum NOx sensor temperature during the prior drive cycle. As used herein, dew point temperature refers to the temperature at which air becomes saturated with water and begins to condense, forming dew. At 100% relative humidity, the ambient temperature equals the dew point temperature. The more negative the dew point temperature is relative to ambient temperature, the less the risk of condensation and the drier the air. While dew point is not temperature dependent, it is affected by pressure.

If the dew point temperature is not less than the maximum NOx sensor temperature during the drive cycle prior to key-off, the method returns and testing is not performed during the engine soak. Such operation may reduce the likelihood of cracking of the sensing element of the NOx sensor, which may occur if the NOx sensor is heated with dew/water within the sensor protection tube which accumulated during the prior drive cycle. It may be preferable to delay performing NOx sensor diagnostics which require heating of the NOx sensor during conditions where condensation within the sensor protection tube is likely, to avoid damage to the sensing element.

Otherwise, if the dew point temperature is less than the maximum NOx sensor temperature during the drive cycle prior to key-off, there is less risk of condensation within the sensor protection tube of the NOx sensor, and thus less risk of thermal cracking of the sensing element during heating of the NOx sensor via the heater. In this case, the answer at 206 is YES, and the method proceeds to 208.

At 208, the method includes determining whether the exhaust temperature at key-off was within a predetermined range. For example, a value of exhaust temperature at the time of key-off stored in memory may be compared to upper and lower thresholds stored in memory which define a predetermined range. Exhaust temperature values outside of this range may produce unreliable test results. For example, when exhaust temperature at key-off is too high, it is an indication of DPF regeneration might have occurred not far from the key-off event, which tends to result in an unreliable SD test outcome. If exhaust temperature is too low at key-off, even if maximum NOx sensor temperature is high enough to indicate that dew point was reached during the prior drive cycle, there may be water condensation near the NOx sensor sensing element. Thus, if the answer at 208 is NO, the method returns, and neither type of test is performed during the engine soak.

Otherwise, if the answer at 208 is YES, the method proceeds to 210 to determine a PCM wakeup delay duration based on the exhaust temperature at key-off. The exhaust temperature at key-off may serve as an indicator of how long it will take for environmental conditions (e.g., oxygen concentration, pressure, temperature, ammonia concentration, NOx concentration) in the exhaust system to stabilize after the key-off. In one non-limiting example, the determined PCM wakeup delay duration is a directly proportional of the exhaust temperature at key-off, such that a higher exhaust temperature at key-off results in a longer PCM wakeup delay duration, and a lower exhaust temperature at key-off results in a shorter PCM wakeup delay duration. The controller may send a signal indicating the duration of the PCM wakeup delay to an electronic timer or alarm clock (e.g., electronic timer 111 described above), and set the electronic timer to the desired the PCM wakeup delay duration before powering off. In one non-limiting example, the PCM wakeup delay duration is approximately 4 hours (e.g., greater than 3 hours and less than 5 hours).

After 210, the method continues to 212 to delay for the PCM wakeup delay duration determined at 208, and then wake up the PCM. In one example, the controller is powered on by an electronic timer or alarm clock (e.g., electronic timer 111 described above in FIG. 1B), and then the controller powers on the various exhaust sensors utilized in the tests to be performed.

After 212, the method proceeds to 214 to determine whether testing entry conditions are met. The testing entry conditions may include, for example, exhaust gas temperature at the NOx sensor, ambient pressure, ambient temperature, and battery voltage all being within respective calibratable ranges.

If the answer at 214 is NO, the method proceeds to 216 to turn off the PCM, and perform no testing during the engine soak. In other examples, however, the PCM may be awoken at predetermined intervals after the initial determination that testing entry conditions have not been met to again determine whether testing entry conditions are met, and if so, proceed to perform the desired tests.

Otherwise, if the answer at 214 is YES, the method proceeds to 218 to activate the NOx sensor heater. For example, this may include applying current from the vehicle battery to the NOx sensor heater.

After 218, the method proceeds to 220. At 220, the NOx sensor reaches light-off, the output of the NOx sensor is detected. Based on (e.g., as a function of) the detected NOx sensor output, a post-light-off heating duration for the NOx sensor for each of the tests to be performed is determined. The post-light-off heating duration for a given test is the length of time the controller will delay, starting from the time the NOx sensor lights off, before performing the test. If only an SD test is to be performed, only a post-light-off heating duration for the SD test is determined; if only an offset test is to be performed, only a post-light-off heating duration for the offset test is determined; and if both an SD test and an offset test are to be performed, respective post-light-off heating durations for both tests are determined.

In one example, upon reaching light-off temperature, the NOx sensor sends a signal to the PCM indicating that the sensor is lit-off and in normal operation. The PCM receives and uses this signal, along with the value of the NOx sensor output at the time of light-off, to determine if a NOx reading from the sensor is valid. This initial NOx reading provides information on how much NOx and/or ammonia is encapsulated within the protection tube of the NOx sensor at the time of light-off. The duration(s) of continued heating of the NOx sensor can be determined as a function of this initial NOx reading to optimize dissipation of NOx/ammonia and also minimize battery current drain. Optionally, other parameter values may factor into the determination of the post-light-off heating durations, or the post-light-off heating durations may be predetermined values stored in memory of the controller. In some examples, the post-light-off heating duration for the SD test is zero, such that the SD test commences upon light-off of the NOx sensor. Further, in examples where both SD and offset tests are performed, the post-light-off heating durations for both tests commence at light-off, and the post-light-off heating duration for the offset test is longer than the post-light-off heating duration for the SD test.

After 220, the method proceeds to 222 to perform the desired test(s), after delaying for the corresponding post-light-off heating duration(s), beginning at light-off. If both SD and offset tests are performed, the respective post-light-off heating durations both begin at the time of light-off of the NOx sensor, and end at different times, with the post-light-off heating duration for the SD test ending before the post-light-off heating duration for the offset test ends, such that further heating of the NOx sensor occurs prior to the offset test. Once the post-light-off heating duration for a given test has elapsed, the test is performed. An SD test may be performed in the manner described in US 2017/0241321, in one non-limiting example. An example method for performing an offset test is shown in FIG. 3.

After 222, the method proceeds to 224 to perform actions responsive to the results of the offset tests as well as the results of any SD tests that were performed. An example method for performing actions responsive to the results of the tests is shown in FIG. 4. After 224, the method returns.

FIG. 3 depicts a high-level flowchart for an example method 300 for performing an offset test, which is a sub-method of method 200.

At 302, the method includes selecting a NOx sensor output monitoring duration, and further selecting minimum and maximum thresholds for NOx sensor output. The minimum and maximum thresholds may define a range of NOx sensor output values which indicate proper NOx sensor operation, whereas NOx sensor output values outside of the range may indicate that performing an offset test will not produce meaningful results. The minimum and maximum thresholds may be determined based on current operating conditions such as sensed temperatures and pressures in the exhaust system or atmosphere.

After 302, the method continues to 304 to sample NOx sensor output throughout the monitoring duration. For example, a signal may be sent from the NOx sensor to the controller continuously throughout the monitoring duration, or the NOx sensor may send signals to the controller intermittently at predetermined intervals.

After 304, the method proceeds to 306. At 306, the method includes calculating an average of the NOx sensor outputs sampled during the monitoring duration, once the monitoring duration has elapsed. The calculation may be performed at the controller.

After 306, the method proceeds to 308. At 308, the method includes determining (e.g., at the controller) whether the minimum threshold determined at 302 is less than or equal to the average NOx sensor output determined at 306, and whether the average NOx sensor output determined at 306 is less than or equal to the maximum threshold determined at 302.

If the answer at 308 is YES, the method proceeds to 310 to indicate that the offset test has passed. For example, indicating that the offset test has passed may include updating memory of the controller with the time and date the offset test was successfully performed. As described below with regard to FIG. 4, vehicle operation may be adjustment responsive to an indication that the offset test passed. After 310, the method returns.

Otherwise, if the answer at 308 is NO, the method proceeds to 312 to indicate that the offset test has failed. For example, indicating that the offset test has failed may include updating memory of the controller to indicate that the offset test failed at the present time and date, and/or prompting the controller to alert the vehicle operator of a NOx sensor malfunction at key-on. The alerting the vehicle operator may include generating a warning light or indicator via a light, LED display, touch screen display, etc., on a vehicle display and/or dashboard of a vehicle, for example. After 312, method 300 returns.

FIG. 4 depicts a high-level flowchart for an example method 400 for performing actions in response to the results of the tests performed, which is also a sub-method of method 200.

At 402, the method includes determining whether an SD test was performed (e.g., during execution of method 200 at 222). If the answer at 402 is YES, the method proceeds to 404 to determine whether the SD test indicated NOx sensor degradation.

If the answer at 404 is YES, the method proceeds to 416 to direct the controller to alert a vehicle operator of NOx sensor malfunction at key-on. In some examples, the alerting the vehicle operator may include generating a warning light or indicator via a light, LED display, touch screen display, etc., on a vehicle display and/or dashboard of a vehicle. After 416, the method continues to 414 to turn off the PCM. After 414, the method returns.

Returning to 404, if the answer is NO and NOx sensor degradation was not indicated based on the results of the SD test, the method proceeds to 406. The method also proceeds to 406 if the answer at 402 is NO, indicating an SD test was not performed.

At 406, the method includes determining whether an offset test was performed (e.g., during execution of method 200 at 222). If the answer at 406 is NO, the method returns. Otherwise, if the answer is YES, the method proceeds to 408.

At 408, the method includes determining whether the offset test passed. If the answer at 408 is NO, the method proceeds to 416 to direct the controller to alert the vehicle operator of NOx sensor malfunction at key-on, and then to 414 to turn off the PCM. After 414, the method returns.

However, if the answer at 408 is YES, the method proceeds to 410. At 410, the method includes replacing a stored offset value of the NOx sensor with the average NOx sensor output (e.g., as determined in method 300 at 306).

After 410, the method proceeds to 412 to adjust engine operating parameters for the next drive cycle based on the updated stored offset value. For example, the controller may adjust engine operation during the next drive cycle such that the updated stored offset value is added to the output of the NOx sensor when the NOx sensor performs measurements. As an example, the controller may make a logical determination (e.g., regarding a position of an actuator such as a urea injector, fuel injector, throttle plate, etc.) based on logic rules that are a function of the updated stored offset value. The controller may then generate a control signal that is sent to the actuator. As a result of adjusting the NOx offset value of the NOx sensor output, the accuracy of SCR NOx conversion efficiency monitoring may be improved. Further, the adjusted NOx offset value may provide better urea injection control if a downstream SCR NOx sensor is used to achieve adaptive control of NH3 storage amount within SCR.

After 412, the method proceeds to 414 to turn off the PCM. After 414, the method returns.

Figure 5:
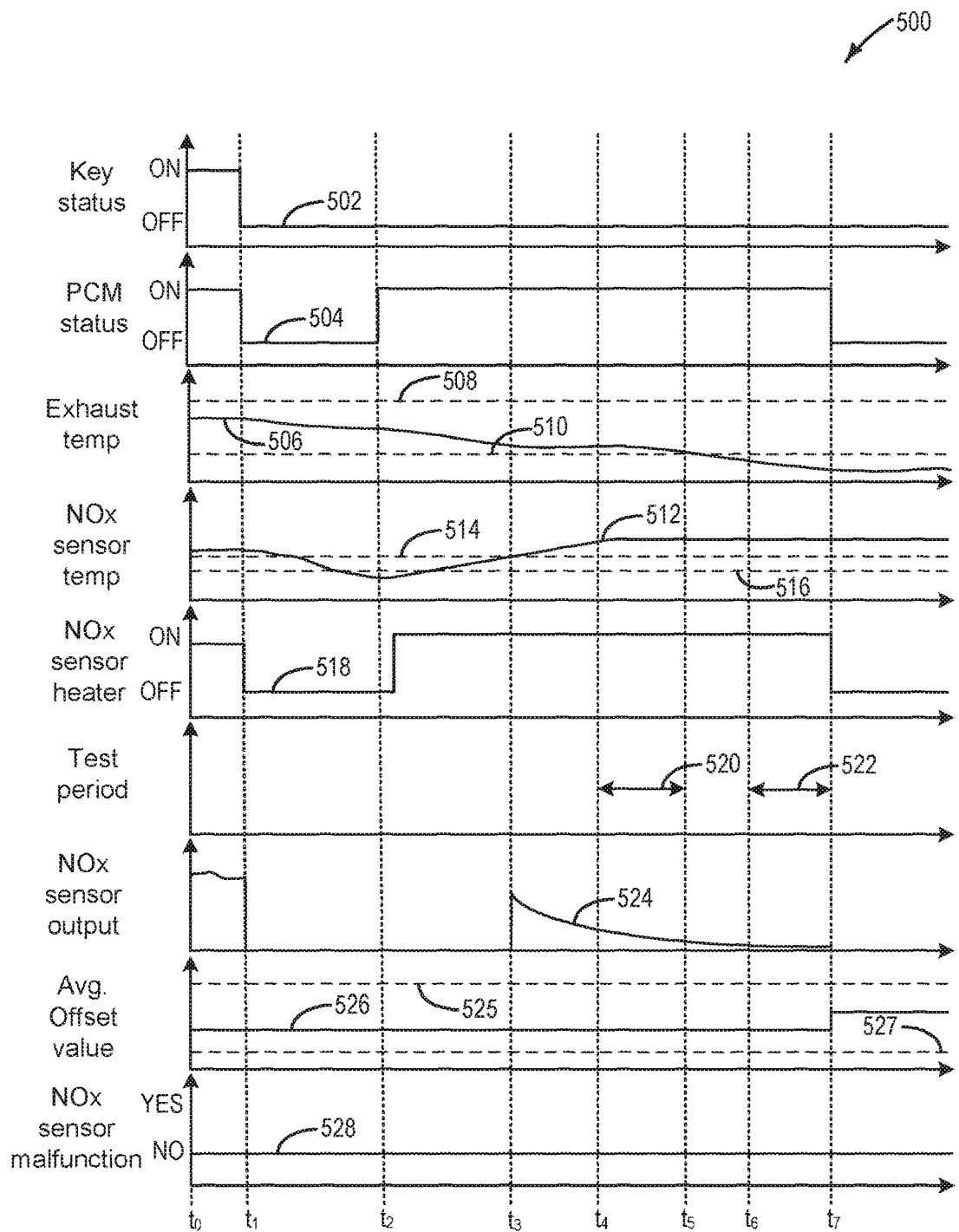
FIG. 5 shows an example timeline for performing SD and offset tests during engine soak in accordance with the methods of FIGS. 3-5.

Turning now to FIG. 5, an example timeline 500 is shown for performing SD and offset tests during engine soak. Timeline 500 includes plot 502, indicating key status (ON or OFF) over time; plot 504, indicating PCM status (ON or OFF) over time; plot 506, indicating exhaust temperature over time; plot 512, indicating NOx sensor temperature over time; plot 518, indicating NOx sensor heater status (ON or OFF) over time; plots 520 and 522, indicating test periods; plot 524, indicating NOx sensor output; plot 526, indicating a stored offset value for the NOx sensor output; and plot 528, indicating whether malfunction of the NOx sensor is indicated.

Dashed line 508 depicts an exemplary upper threshold of an exhaust temperature range, and dashed line 510 depicts an exemplary lower threshold of the exhaust temperature range. In one non-limiting example, upper threshold 508 may be a non-zero positive temperature in the range of 450~650° C., whereas lower threshold 510 may be a non-zero positive temperature in the range of 30~70° C. During execution of method 200, if the exhaust temperature at key-off is within this range (e.g., greater than the lower threshold temperature and less than the upper threshold temperature), the testing may proceed, whereas if the exhaust temperature at key-off is not within this range, the method returns and testing is not performed during the engine soak. In one non-limiting example, exhaust temperature may be determined based on output of a sensor such as exhaust gas temperature sensor 127 of FIG. 1B.

Dashed line 514 depicts an exemplary light-off temperature of the NOx sensor (e.g., the temperature at which the NOx sensor becomes fully operational), and dashed line 516 depicts an exemplary dew point temperature. In one non-limiting example, light-off temperature 514 may be a non-zero positive temperature in the range of 700~800° C., and dew point temperature 516 may be a non-zero positive temperature in the range of 90~120° C. During execution of method 200, if the maximum NOx sensor temperature during the drive cycle prior to key-off is greater than the dew point temperature, the testing may proceed if other entry conditions are met, whereas if the maximum NOx sensor temperature during the drive cycle prior to key-off is not greater than the dew point temperature, the method returns and testing is not performed during the engine soak. Such operation may reduce the likelihood of cracking of the sensing element of the NOx sensor, which may occur if dew (condensed water) accumulated during the prior drive cycle is within the sensor protection tube during heating of the NOx sensor.

Dashed line 525 depicts an exemplary upper threshold of the average NOx sensor output, and dashed line 527 depicts an exemplary lower threshold of the average NOx sensor output. In one non-limiting example, upper threshold 525 may be a non-zero positive value in the range of 40~50 ppm, whereas lower threshold 527 may be a non-zero negative value in the range of −15~−30 ppm. During execution of method 300, if the average of the NOx sensor outputs sampled during the duration of the offset testing as calculated by the controller is within this range (e.g., greater than the lower threshold and less than the upper threshold), the offset test passes, and if not the offset test fails.

The interval between time $t_0$ and time $t_1$, represents a portion of a drive cycle (e.g., the prior drive cycle referred to in method 200 at 204). During this interval, the key status is ON, the PCM status is ON, and the exhaust temperature is within the range referred to in method 200 at 208 (e.g., greater than threshold 510 and less than threshold 508). Further, as the NOx sensor temperature is greater than the light-off temperature 514, the NOx sensor is providing an output signal indicative of the NOx concentration of the engine exhaust. Furthermore, the NOx sensor temperature is greater than the dew point temperature 516; as such, the maximum NOx sensor temperature during this interval exceeds the dew point temperature. Accordingly, the conditions of method 200 at 206 and 208 are satisfied.

At time $t_1$, a key-off event occurs, and the key status and PCM status switch from ON to OFF. The duration between time $t_1$ and time $t_2$ corresponds to the PCM wakeup delay duration (e.g., the PCM wakeup delay duration determined via method 200 at 210). Thus, at time $t_2$, the alarm clock sends a signal to the PCM which turns on ("wakes up") the PCM. In the depicted example. In other examples, however, the PCM may remain on for some duration after the key-off event, in which case the PCM wakeup delay duration begins when the PCM turns off rather than at key-off. Upon waking up, the PCM determines whether testing entry conditions are met, such as those described above for method 200 at 214. In the depicted example, testing entry conditions are met, and thus the NOx sensor heater is activated shortly after time $t_2$.

In the interval between time t2 and time t3, the NOx sensor temperature increases as the NOx sensor is heated by the heater. At time t3, the NOx sensor reaches light-off temperature 514, such that the NOx sensor begins outputting meaningful results. At this time, NOx sensor output is detected and factors into determination of a post-light-off heating duration for offset testing if offset testing is desired, and a determination of a post-light-off heating duration of SD testing if SD testing is desired. In the depicted example, both SD testing and offset testing are desired; the interval between $t_3$ and $t_4$ represents the determined post-light-off heating duration for SD testing (e.g., the time period between NOx sensor light-off and commencement of SD testing), whereas the interval between $t_3$ and $t_6$ represents the determined post-light-off heating duration for offset testing. In other examples, however, SD testing may begin once the NOx sensor lights off.

At time $t_4$, the post-light-off heating duration for SD testing ends, and SD testing is performed during test period 520. Test period 520 concludes at time $t_5$, at which time the post-light-off heating duration for offset testing has not yet ended. In the depicted example, NOx sensor malfunction (e.g., in the form of gain skew) is not detected during the SD testing, and thus the PCM prepares to perform offset testing. Accordingly, the NOx sensor heater continues heating the NOx sensor, and offset testing does not begin until time $t_6$ which represents the time at which the post-light-off heating duration for offset testing ends (such that there is a delay between the completion of the SD testing and the start of the offset testing). At this time, offset testing begins and continues through the duration of test period 522.

From time $t_0$ through time $t_7$, the average offset value 526 of the NOx sensor is within the range defined by upper threshold 525 and lower threshold 527. However, in the depicted example, the average value of the offsets detected by the NOx sensor throughout the test period 522 is higher than a previously determined average NOx sensor offset value stored in memory of the PCM. In the depicted example, the new average offset is still within the range. Therefore, the offset test passes, and NOx sensor malfunction is not indicated (as shown by plot 528 remaining at NO). Accordingly, upon completion of offset testing at t$_7$, the stored average offset value is replaced with the newly determined higher offset value (as shown by plot 526). As testing is now completed, the NOx sensor heater is turned OFF, as further heating of the NOx sensor is not needed, and the PCM is turned off. In contrast, in examples where the new average offset value is not within the range, NOx sensor malfunction is indicated, and the stored offset value is not replaced.

In accordance with the systems and methods described above, the PCM is turned on during an engine soak (e.g., several hours into the engine soak) to perform a NOx sensor offset test, optionally preceded by a NOx sensor SD test. The testing involves waking up the PCM via an alarm clock after delaying for a duration after key-off, beginning to heat the NOx sensor via a NOx sensor heater, and then continuing to heat the NOx sensor after it reaches light-off temperature for a calibratable duration before performing offset testing. The technical effect of performing additional NOx sensor heating after the NOx sensor reaches light-off temperature and prior to performing the offset testing is the dissipation of encapsulated NOx, NH3, and moisture within the sensor protection tube, which in turn reduces the chance of an erroneously high NOx offset reading.

In one exemplary embodiment of the present disclosure, a method for an engine-driven vehicle includes, at key-off of the engine-driven vehicle, waiting for a first duration before waking up a PCM and activating a heater of an exhaust NOx sensor; at NOx sensor light-off, waiting for a second duration, and then performing a NOx sensor SD test; and once a third duration has elapsed since NOx sensor light-off, the third duration longer than the second duration, performing a NOx sensor offset test. A first example of the method further includes measuring exhaust temperature at key-off, and determining the first duration based on the measured exhaust temperature. A second example of the method optionally includes the first example and further includes, at NOx sensor light-off, detecting NOx sensor output and determining the second and third durations based on the detected NOx sensor output. In a third example of the method, which optionally includes one or more of the first and second examples, performing the NOx sensor offset test comprises selecting a NOx sensor output monitoring duration, sampling NOx sensor output throughout the monitoring duration, and calculating an average of the sampled NOx sensor outputs after the monitoring duration. In a fourth example of the method, which optionally includes one or more of the first, second, and third examples, performing the NOx sensor offset test further comprises determining whether the calculated average is greater than or equal to a minimum threshold and less than or equal to a maximum threshold, and if so, indicating that the offset test passed, and if not, indicating that the offset test failed. A fifth example of the method, which optionally includes one or more of the first, second, third, and fourth examples, further includes, in response to an indication that the offset test passed, replacing a stored offset value with the calculated average and adjusting engine operation at key-on based on the updated stored offset value; and in response to an indication that the offset test failed, directing the PCM to alert a vehicle operator of NOx sensor malfunction at key-on. A sixth example of the method, which optionally includes one or more of the first, second, third, fourth, and fifth examples, further includes, in response to an indication that the SD test indicated NOx sensor gain skew, directing the PCM to alert a vehicle operator of NOx sensor malfunction at key-on.

In another exemplary embodiment of the present disclosure, a method for an engine-driven vehicle includes, during a soak period following key-off of an engine-driven vehicle, waking up a powertrain control module (PCM); heating an exhaust NOx sensor; at light-off of the NOx sensor, detecting NOx sensor output, determining a duration to continue heating the NOx sensor based on the detected output, and continuing to heat the NOx sensor until the duration ends; and performing a NOx sensor offset test at the end of the duration. In a first example of the method, the determined duration to continue heating the NOx sensor is longer for a first, higher NOx sensor output and shorter for a second, lower NOx sensor output which is lower than the first NOx sensor output. In a second example of the method, which optionally includes the first example, performing the NOx sensor offset test comprises selecting a NOx sensor output monitoring duration, sampling NOx sensor output throughout the monitoring duration, and calculating an average of the sampled NOx sensor outputs after the monitoring duration. In a third example of the method, which optionally includes one or more of the first and second examples, performing the NOx sensor offset test further comprises determining whether the calculated average is greater than or equal to a minimum threshold and less than or equal to a maximum threshold, and if so, indicating that the offset test passed, and if not, indicating that the offset test failed. A fourth example of the method optionally includes one or more of the first, second, and third examples, and further includes measuring exhaust temperature at key-off, and determining a duration to delay waking up the PCM after key-off based on the measured exhaust temperature. A fifth example of the method, which optionally includes one or more of the first, second, third, and fourth examples, further includes that the PCM is awoken approximately 4 hours after key-off.

In yet another exemplary embodiment of the present disclosure, a system includes a NOx sensor positioned in an engine exhaust system downstream of an SCR catalyst; an electronic timer; and a controller in electrical communication with the electronic timer and the NOx sensor, the controller having computer-readable instructions for: at a key-off event, determining a sleep duration for the controller to power off after the key-off event prior to initiating heating of the NOx sensor, sending the sleep duration to the electronic timer and starting the timer, and powering off after sending the sleep duration to the electronic timer; wherein the electronic timer powers on the controller after the sleep duration expires, and wherein the controller includes further computer-readable instructions for: responsive to powering on, initiating heating of the NOx sensor; at light-off of the NOx sensor, detecting NOx sensor output and determining a post-light-off heating duration to delay before performing a NOx sensor offset test based on the detected NOx sensor output; and initiating the NOx sensor offset test after the post-light-off heating duration expires. In a first example of the system, the controller has further computer-readable instructions for measuring a temperature of the exhaust system at key-off, and determining the sleep duration based on the measured temperature. In a second example of the system, which optionally includes the first example, the instructions for initiating the NOx sensor offset test comprise instructions for selecting a NOx sensor output monitoring duration, sampling NOx sensor output throughout the monitoring duration, and calculating an average of the sampled NOx sensor outputs after the monitoring duration. In a third example of the system, which optionally includes one or more of the first and second examples, the instructions for initiating the NOx sensor offset test further comprise instructions for determining whether the calculated average is greater than or equal to a minimum threshold and less than or equal to a maximum threshold, and if so, indicating that the offset test passed, and if not, indicate that the offset test failed. In a fourth example of the system, which optionally includes one or more of the first, second, and third examples, the controller has further computer-readable instructions for, at light-off of the NOx sensor, determining a post-light-off heating duration to delay before performing a NOx sensor SD test based on the detected NOx sensor output, and initiating the NOx sensor SD test after the post-light-off heating duration expires. In a fifth example of the system, which optionally includes one or more of the first, second, third, and fourth examples, the post-light-off heating duration to delay before performing the NOx sensor SD test is shorter than the post-light-off heating duration to delay before performing the NOx sensor offset test. In a sixth example of the system, which optionally includes one or more of the first, second, third, fourth, and fifth examples, the controller has further computer-readable instructions for alerting a vehicle operator of NOx sensor malfunction at key-on in response to an indication that the offset test failed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer-readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   at vehicle-off of an engine-driven vehicle, waiting for a first duration before waking up a powertrain control module (PCM) and activating a heater of an exhaust NOx sensor;
   at NOx sensor light-off, waiting for a second duration, and then performing a NOx sensor self-diagnostic (SD) test; and
   once a third duration has elapsed since NOx sensor light-off, the third duration longer than the second duration, performing a NOx sensor offset test.

2. The method of claim 1, further comprising measuring exhaust temperature at vehicle-off, and determining the first duration based on the measured exhaust temperature.

3. The method of claim 2, further comprising, at NOx sensor light-off, detecting NOx sensor output and determining the second and third durations based on the detected NOx sensor output.

4. The method of claim 3, wherein performing the NOx sensor offset test comprises selecting a NOx sensor output monitoring duration, sampling NOx sensor output throughout the monitoring duration, and calculating an average of the sampled NOx sensor outputs after the monitoring duration.

5. The method of claim 4, wherein performing the NOx sensor offset test further comprises determining whether the calculated average is greater than or equal to a minimum threshold and less than or equal to a maximum threshold, and if so, indicating that the offset test passed, and if not, indicating that the offset test failed.

6. The method of claim 5, further comprising:
   in response to an indication that the offset test passed, replacing a stored offset value with the calculated average and adjusting engine operation at vehicle-on based on the updated stored offset value; and
   in response to an indication that the offset test failed, directing the PCM to alert a vehicle operator of NOx sensor malfunction at vehicle-on.

7. The method of claim 6, further comprising:
   in response to an indication that the SD test indicated NOx sensor gain skew, directing the PCM to alert the vehicle operator of NOx sensor malfunction at vehicle-on.

8. A method, comprising:
   during a soak period following vehicle-off of an engine-driven vehicle, waking up a powertrain control module (PCM);
   heating an exhaust NOx sensor;
   at light-off of the NOx sensor, detecting NOx sensor output, determining a duration to continue heating the NOx sensor based on the detected output, and continuing to heat the NOx sensor until the duration ends; and
   performing a NOx sensor offset test at the end of the duration.

9. The method of claim 8, wherein the determined duration to continue heating the NOx sensor is longer for a first, higher NOx sensor output and shorter for a second, lower NOx sensor output which is lower than the first NOx sensor output.

10. The method of claim 8, wherein performing the NOx sensor offset test comprises selecting a NOx sensor output monitoring duration, sampling NOx sensor output throughout the monitoring duration, and calculating an average of the sampled NOx sensor outputs after the monitoring duration.

11. The method of claim 10, wherein performing the NOx sensor offset test further comprises determining whether the calculated average is greater than or equal to a minimum threshold and less than or equal to a maximum threshold, and if so, indicating that the offset test passed, and if not, indicating that the offset test failed.

12. The method of claim 8, further comprising measuring exhaust temperature at vehicle-off, and determining a duration to delay waking up the PCM after vehicle-off based on the measured exhaust temperature.

13. The method of claim 8, wherein the PCM is awoken approximately 4 hours after vehicle-off.

14. A system comprising:
a NOx sensor positioned in an engine exhaust system downstream of a selective catalytic reduction (SCR) catalyst;
an electronic timer; and
a controller in electrical communication with the electronic timer and the NOx sensor, the controller having computer-readable instructions for:
at a vehicle-off event, determining a sleep duration for the controller to power off after the vehicle-off event prior to initiating heating of the NOx sensor, sending the sleep duration to the electronic timer and starting the timer, and powering off after sending the sleep duration to the electronic timer;
wherein the electronic timer powers on the controller after the sleep duration expires, and wherein the controller includes further computer-readable instructions for:
responsive to powering on, initiating heating of the NOx sensor;
at light-off of the NOx sensor, detecting NOx sensor output and determining a post-light-off heating duration to delay before performing a NOx sensor offset test based on the detected NOx sensor output; and
initiating the NOx sensor offset test after the post-light-off heating duration expires.

15. The system of claim 14, wherein the controller has further computer-readable instructions for measuring a temperature of the exhaust system at vehicle-off, and determining the sleep duration based on the measured temperature.

16. The system of claim 14, wherein the instructions for initiating the NOx sensor offset test comprise instructions for selecting a NOx sensor output monitoring duration, sampling NOx sensor output throughout the monitoring duration, and calculating an average of the sampled NOx sensor outputs after the monitoring duration.

17. The system of claim 16, wherein the instructions for initiating the NOx sensor offset test further comprise instructions for determining whether the calculated average is greater than or equal to a minimum threshold and less than or equal to a maximum threshold, and if so, indicating that the offset test passed, and if not, indicate that the offset test failed.

18. The system of claim 17, wherein the controller has further computer-readable instructions for alerting a vehicle operator of NOx sensor malfunction at vehicle-on in response to an indication that the offset test failed.

19. The system of claim 14, wherein the controller has further computer-readable instructions for, at light-off of the NOx sensor, determining a post-light-off heating duration to delay before performing a NOx sensor self-diagnosis (SD) test based on the detected NOx sensor output, and initiating the NOx sensor SD test after the post-light-off heating duration expires.

20. The system of claim 19, wherein the post-light-off heating duration to delay before performing the NOx sensor SD test is shorter than the post-light-off heating duration to delay before performing the NOx sensor offset test.

* * * * *